(No Model.)
F. D. WINKLEY.
OIL CUP.
No. 470,734. Patented Mar. 15, 1892.
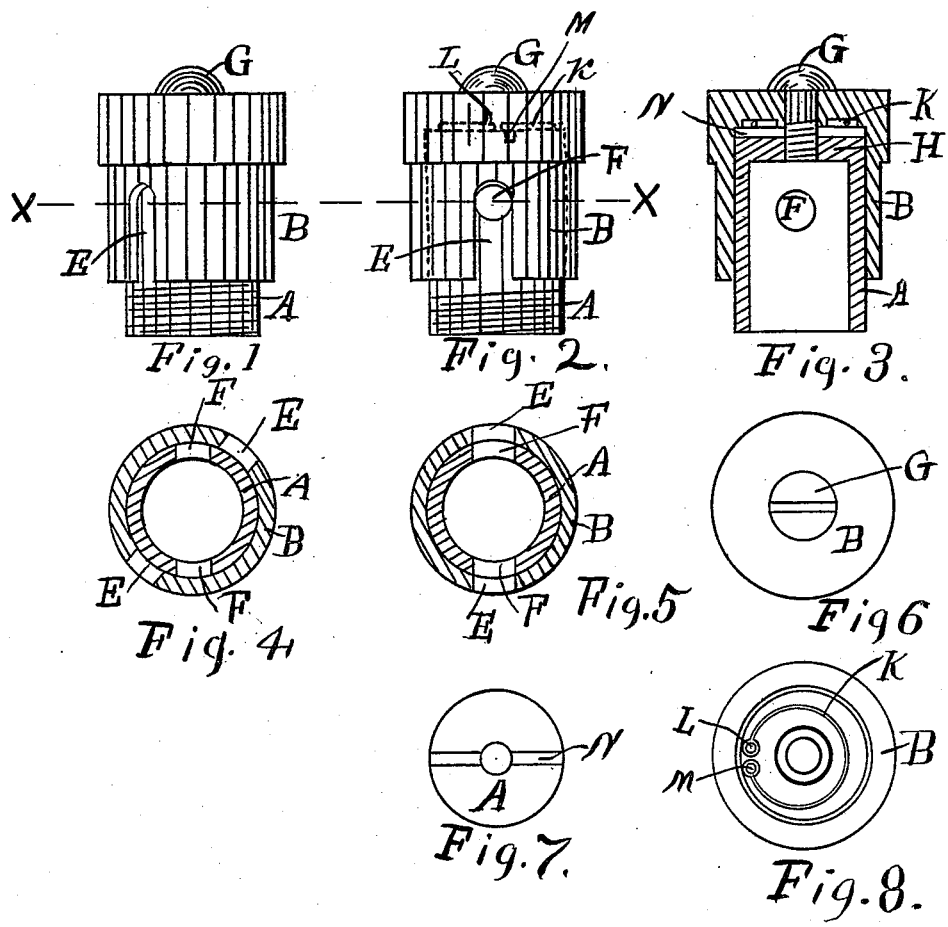
Witnesses
N. S. Johnson
C. W. Murray
Inventor
Frank D. Winkley.

UNITED STATES PATENT OFFICE.

FRANK D. WINKLEY, OF MADISON, WISCONSIN.

OIL-CUP.

SPECIFICATION forming part of Letters Patent No. 470,734, dated March 15, 1892.

Application filed June 9, 1891. Serial No. 395,721. (No model.)

*To all whom it may concern:*

Be it known that I, FRANK D. WINKLEY, a citizen of the United States, residing at Madison, in the county of Dane and State of Wisconsin, have invented certain new and useful Improvements in Oil-Cup Covers; and I do hereby declare the following to be a full, clear, and exact description of the invention, such as will enable others skilled in the art to which it pertains to make and use the same.

The object of my invention is to provide a suitable cover for the oil-holes in machinery that have not heretofore, as as a rule, been provided with any protective coverings to exclude foreign substances that might find their way into the bearings, where they would be liable to cause friction and wear.

In nearly all machinery it has been the custom to drill oil-holes into certain of the journal-bearings where it is not practicable to put any oil-cups or other suitable devices for protection of the bearings as oil-cups have heretofore been constructed. Such holes might be provided with plugs; but more frequently they were not, and if they were they were soon lost and the holes thus left open became the receptacle of gritty substances that would be washed into the bearings when oil was injected to them and cause evil results.

To provide a dust-tight oil-cup or oil-cup cover that would be adaptable to any locality in a machine, be easily opened for the introduction of oil, have no detachable parts that would be liable to be lost, and have no place upon it for the accumulation of dust that would be liable to be washed into the bearings are the objects of my invention.

My invention consists of two principal parts consisting of two hollow cylinders each with one end open and the other closed by a solid head. One is adapted to fit over the other and rotate freely about, the two being connected by a screw passing through their solid heads.

Figure 1 represents my improved oil-cup cover on a larger scale than it would probably be made in its normal closed position. Fig. 2 shows the same with the cup turned in a position to receive the oil. Fig. 3 is a sectional view showing the manner of fastening the cap to the body, the spring K for retaining the cap in a closed position, and the retaining-pins that limit the action of the spring. Figs. 4 and 5 are sectional views on the line $xx$, showing the cover closed in Fig. 4 and open in Fig. 5 when the holes E and F are made to register. Fig. 6 is a top view of the cover. Fig. 7 is a top view of the inner cylinder A with the slot N cut transversely in the top of the solid end, by means of which it can be screwed into its seat. Fig. 8 is a view within the cap B, showing the spring K and the pins L and M.

A is a hollow cylinder provided at its open end with a screw-thread for securing it in its seat, the opposite end being closed by the solid head H, in the top of which the slot N is cut, into which a screw-driver can be placed to secure it in its seat. One or more holes F F, through which oil can be injected into the interior of the cylinders, are bored through the walls of the cylinder into the inner chamber.

The cap B is a hollow cylinder with a closed top, adapted to freely rotate through a small arc on the body of the cylinder A and held in position by the screw G and the spring K. The cap B is further provided with a number of slots extending from its lower or open end about one-half its height. These slots are the same in number as the holes in the inner cylinder and can be made to cover them or uncover them by rotating it about the same. In the under side of the solid end in the cap B an annular recess is formed, in which the spring K is located. This spring is in the form of a circle with its inner ends formed in two eyes, which encircle the pins, one of which is fast in the body A and the other in the cap B. The natural tendency of the spring is to close or coil up; but this tendency is limited by the contact of the two eyes through which the pins L and M pass, thus forming a stop which limits the movements of the cap B and establishes its proper position when closed. By rotating the cap B so as to open the spring the openings in the cap and body are made to register. Oil can then be injected through the holes F F, and when the cap B is released it will return to its normal position and close the holes F F. By cutting slots E through the lower end of the cap B no place is left where dirt can lodge and be worked into the holes F F when the cap is turned for the introduction of oil into the bearings.

I claim as my invention—

1. In an oil-cup, the combination of the cylinder A, adapted to be secured to the bearing, the cylinder B, supported by the cylinder A to rotate thereon, each of said cylinders having an opening which is brought into alignment by the rotation of the cylinder B on the cylinder A, and the spring between the cylinders, arranged to rotate the cylinder B back to normal position after it is operated, substantially as described.

2. In an oil-cup, the combination of the inner cylinder having an opening and adapted to be secured to the journal-bearing and the outer cylinder arranged to turn upon the inner cylinder, having a slot adapted to register with opening in the inner cylinder, the said slot extending to the lower edge of the outer cylinder, substantially as described.

3. In combination in an oil-cup, the inner cylinder having its upper end closed by a head, and the outer cylinder also having an upper head, said cylinders having openings in their sides arranged to register when the outer cylinder is rotated on the inner cylinder, the means for holding the cylinders together, consisting of the central screw connecting the heads, and the spring for rotating the outer cylinder back to normal position interposed between the heads, substantially as described.

In testimony whereof I have signed this specification in the presence of two subscribing witnesses.

FRANK D. WINKLEY.

Witnesses:
N. S. JOHNSON,
C. W. MURRAY.